(12) United States Patent
Kataumi et al.

(10) Patent No.: US 6,189,398 B1
(45) Date of Patent: Feb. 20, 2001

(54) SHIFT-LEVER DEVICES (75) Inventors: Yoshimasa Kataumi, Saitama; Ryoichi Fujiwara, Shizuoka, both of (JP)

(73) Assignee: Fuji Koko Co., Ltd., Tokyo (JP)

( * ) Notice: Under 35 U.S.C. 154(b), the term of this patent shall be extended for 0 days.

(21) Appl. No.: 09/206,709

(22) Filed: Dec. 7, 1998

(30) Foreign Application Priority Data

Feb. 27, 1998 (JP) .................................................. 10-47035
Feb. 27, 1998 (JP) .................................................. 10-47036

(51) Int. Cl.[7] ............................... F16H 1/14; G05G 1/20; G05G 5/06
(52) U.S. Cl. .................................................. 74/423; 74/538
(58) Field of Search ............................. 74/473.23, 538, 74/473.24, 483 PB, 475; 192/4

(56) References Cited

U.S. PATENT DOCUMENTS

| | | | |
|---|---|---|---|
| 4,078,447 | * | 3/1978 | Kato et al. ................... 74/473.23 X |
| 5,186,069 | * | 2/1993 | Asano et al. ...................... 74/475 X |
| 5,402,870 | * | 4/1995 | Osborn ...................................... 192/4 |
| 5,617,760 | | 4/1997 | Woeste et al. .......................... 74/475 |

FOREIGN PATENT DOCUMENTS

| | | |
|---|---|---|
| 2 247 222 | 3/1974 | (DE) . |
| 93 05 846 | 10/1994 | (DE) . |
| 195 06 766 | 2/1996 | (DE) . |
| 195 13 809 | 10/1996 | (DE) . |
| 0 459 485 | 12/1991 | (EP) . |
| 0 695 663 | 2/1996 | (EP) . |
| 0 759 517 | 2/1997 | (EP) . |
| 62-281021 | 12/1987 | (JP) . |
| 6-45159 | 6/1994 | (JP) . |
| 6-53853 | 7/1994 | (JP) . |
| 7-54975 | 2/1995 | (JP) . |

* cited by examiner

Primary Examiner—Thomas R. Hannon
Assistant Examiner—Colby Hansen
(74) Attorney, Agent, or Firm—Foley & Lardner (57) ABSTRACT

A shift-lever device includes a position plate integrated with a base plate and formed with a detent groove, a shift lever supported to the base plate to be swingable along the position plate and including a base arranged adjacent to the position plate, and a compression rod arranged through the shift lever to axially be movable by operation of a knob button. A detent protrusion is arranged with the compression rod at a lower end to be engageable with the detent groove. A guide integrated with the base of the shift lever holds part of the detent protrusion longitudinally with respect to a vehicle body.

14 Claims, 8 Drawing Sheets

SHIFT-LEVER DEVICES

BACKGROUND OF THE INVENTION

The present invention relates generally to shift-lever devices for motor vehicles, and more particularly, to the shift-lever devices wherein when pressing a knob button arranged at the upper end of a shift lever, a compression rod arranged therethrough is moved to disengage a position pin arranged at the lower end from a detent groove of a detent or position plate, enabling shifting of the shift lever.

Conventionally, automatic transmission operating devices or shift-lever devices for motor vehicles include a shift lever comprising a pipe and longitudinally swingably supported to a housing fixed to a vehicle body, and a compression rod vertically movably arranged therethrough. When operating a knob button that is in slide contact with a taper surface formed at the upper end of the shift lever, the compression rod is moved against a biasing force to disengage a position pin arranged at the lower end from a detent groove of a detent or position plate arranged in the housing, making the shift lever swingable. Through a cable connected at the lower end of the shift lever, shifting of the shift lever is transmitted to operate an automatic transmission.

A known shift locking unit includes a lock lever for preventing movement of the shift lever by contacting it when the position pin is in the parking (P) range. The lock lever is rotated by a solenoid that operates when detecting actuation of a brake switch, etc., so that even when pressing the knob button, the position pin contacts the lock lever, obtaining no movement of the compression rod.

Regarding the known shift-lever devices, however, due to the fact that a pressing force applied to the knob button is input to the lock lever through the position pin, the lock lever needs to have a sufficient strength to resist this pressing force. This causes an increase not only in weight of the lock lever, but in size of the solenoid for actuating the lock lever, resulting in an increase in size and manufacturing cost of the shift locking unit.

It is, therefore, an object of the present invention to provide shift-lever devices for motor vehicles that contributes to a reduction in size and manufacturing cost of a shift locking unit.

SUMMARY OF THE INVENTION

One aspect of the present invention lies in providing a shift-lever device for a motor vehicle with a vehicle body, comprising:
- a base plate mounted to the vehicle body;
- a position plate integrated with said base plate, said position plate being formed with a detent groove;
- a shift lever supported to said base plate to be swingable along said position plate, said shift lever including a base arranged adjacent to said position plate, a knob arranged at an upper end, and a knob button arranged with said knob;
- a compression rod arranged through said shift lever to axially be movable by operation of said knob button of said shift lever, said compression rod including an arm at a lower end;
- a detent protrusion arranged with said compression rod at a lower end to be engageable with said detent groove of said position plate; and
- a guide integrated with said base of said shift lever, said guide holding part of said detent protrusion longitudinally with respect to the vehicle body.

Another aspect of the present invention lies in providing a shift-lever device for a motor vehicle with a vehicle body, comprising:
- a base plate mounted to the vehicle body;
- a position plate integrated with said base plate;
- a shift lever swingably supported to said base plate to be swingable along said position plate, said shift lever including a knob arranged at an upper end and a knob button arranged with said knob;
- a compression rod arranged through said shift lever to axially be movable by operation of said knob button of said shift lever, said compression rod including an arm at a lower end;
- a pusher mounted to said compression rod at an upper end, said pusher being formed with a taper inclined with respect to said knob button;
- an engaging member swingably mounted to said knob button, said engaging member including a first lever contacting said taper of said pusher from the side of said knob button to allow axial movement of said compression rod; and
- a shift locking unit mounted to said position plate, wherein when said shift lever is moved to a P range, said shift locking unit is engaged with said arm of said compression rod to prevent axial movement of said compression rod.

DETAILED DESCRIPTION OF THE INVENTION

Figure 1:
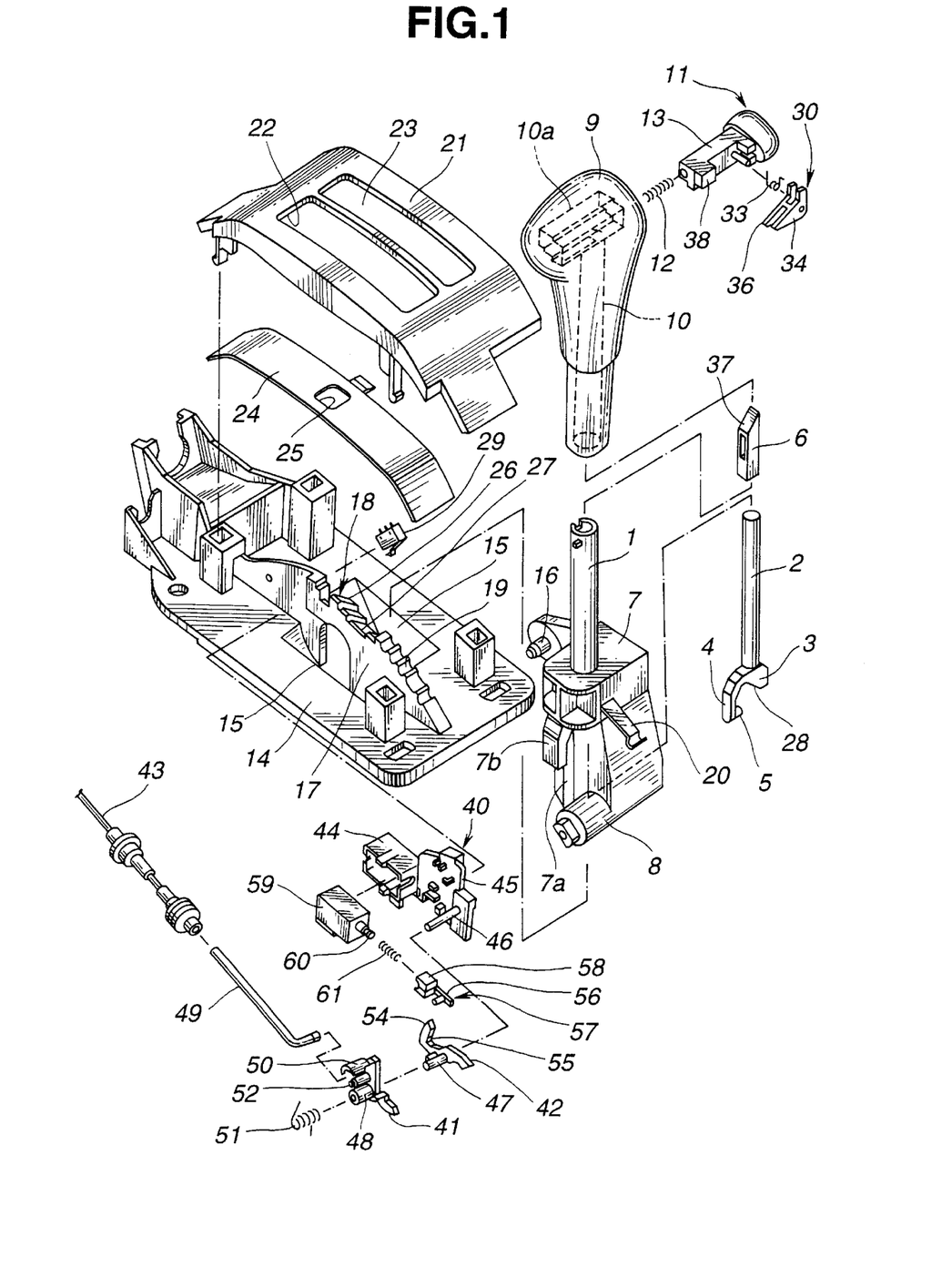
FIG. 1 is an exploded perspective view showing a shift-lever device embodying the present invention.

Referring to FIG. 1, a shift-lever device for motor vehicles embodying the present invention includes a shift lever 1 comprising a pipe made of metal or synthetic resin, and a compression rod 2 made of metal or synthetic resin arranged therethrough. Integrated with the compression rod 2 at the lower end are a detent protrusion 3 and a substantially C-shaped arm 4 extending downward from the side of the detent protrusion 3. A pin-like shank 5 is integrally formed with the arm 4 at an end, and a pusher 6 is integrally connected to the compression rod 2 at the upper end.

Figure 9:
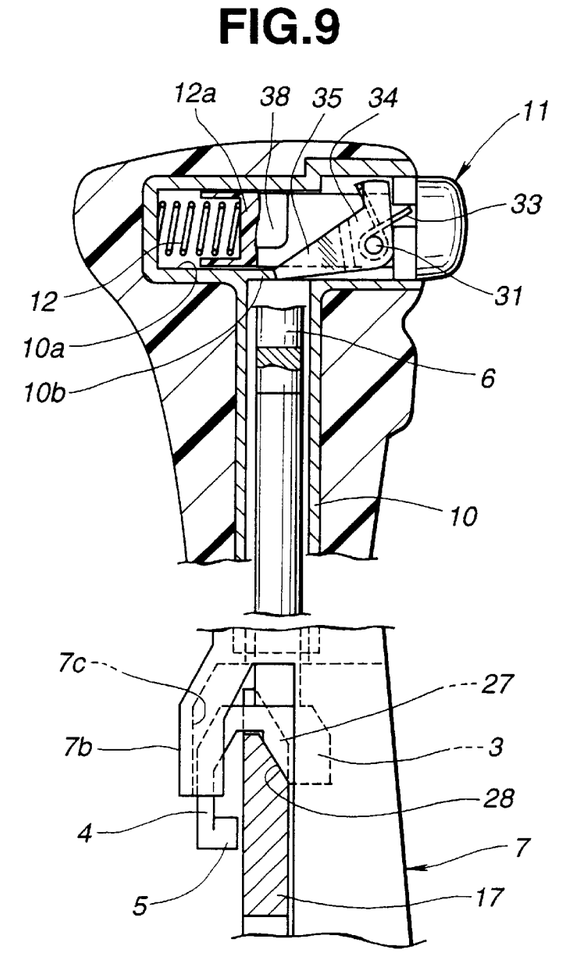
FIG. 9 is a view similar to FIG. 6, for explaining operation of the shift lever.

The shift lever 1 comprises a base 7 and a metallic pipe integrated therewith or inserted therein. The shift lever 1 is engaged with a skeleton 10 of a knob 9, which abuts on the shift-lever base 7. The compression rod 2 is inserted in the shift lever 1 upward from the lower side of the shift-lever base 7, so that the pusher 6 is located in a T-shaped knob-button hole 10a formed in the knob 9 above the skeleton 10. A knob-button 11 is arranged in the knob-button hole 10a, and a spring 12 is arranged therein to bias the knob-button 11. Referring to FIG. 9, a step 10b is formed in the knob-button hole 10a and at the upper end of the skeleton 10.

The shift-lever base 7 is arranged longitudinally swingably with respect to a vehicle body through a shank 8 integrated with the shift-lever base 7 and supported to bearings 15 of a base plate 14 fixed to the vehicle body. The shift-lever base 7 includes a connecting protrusion 16 for a shift cable, not shown. A position plate 17 is integrated with the base plate 14 substantially in the center, and has a detent groove 18 and wavelike irregularities 19 formed in the upper side. A spring 20 fixed to the shift-lever base 7 contacts the irregularities 19 resiliently. The shift-lever base 7 is disposed adjacent to one side of the position plate 17, and is supported thereto longitudinally swingably with respect to the vehicle body along the position plate 17.

An indicator cover 21 is mounted to the base plate 14, and has a guide hole 22, through which the shift lever 1 is arranged. A shift indicator 23 is arranged beside the guide hole 22 to indicate parking (P), reverse (R), neutral (N), drive (D), first speed (1), etc. A slide cover 24 having a hole 25 for the knob 9 is arranged to conceal the guide hole 22 of the indicator cover 21.

Figure 2:
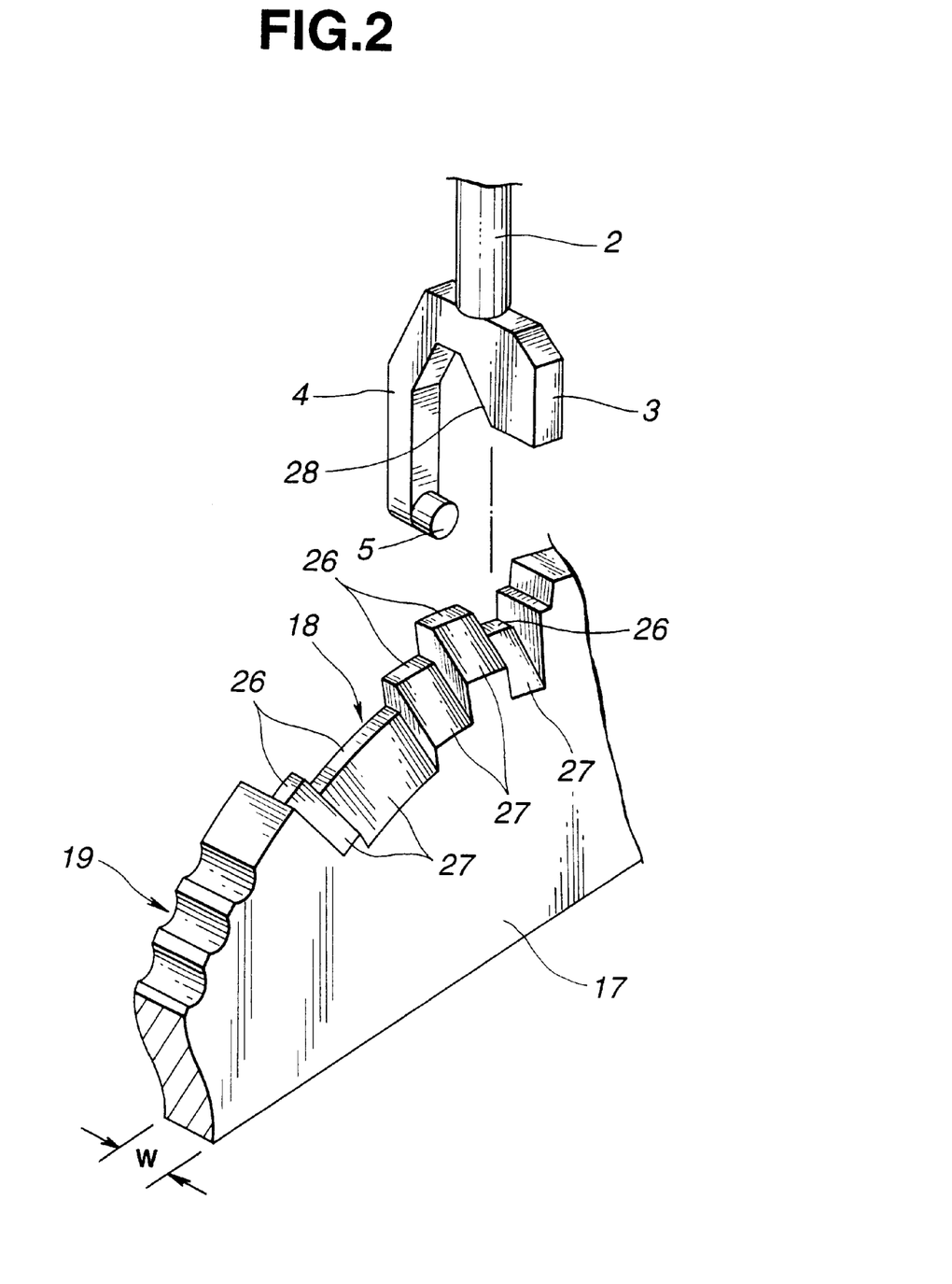
FIG. 2 is a perspective view showing a detent groove and a detent protrusion.

Regarding the detent protrusion 3 and the detent groove 18, referring to FIG. 2, the detent protrusion 3 faces shift portions 26 formed in the upper side of the detent groove 18 and corresponding to P, R, N, D, 1, etc. The detent protrusion 3 is vertically movably arranged to be engaged with and disengaged from the shift portion 26. The shift portion 26 has on the side of the shift-lever base 7 a taper surface 27 that inclines downward, whereas the detent protrusion 3 has a taper surface 28 that faces the taper surface 27 in parallel thereto and inclines downward. The arm 4 is formed opposite to the taper surface 28 to operate a shift locking unit 40 fixed to the position plate 17 on the side opposite to the side on which the shift-lever base 7 is arranged. The detent protrusion 3 and the arm 4 are arranged to hold the position plate 17 to restrict the detent protrusion 3 so as not to disengage from the shift portion 26.

A slit-like guide 7a having a vertical opening is formed in the shift-lever base 7 to hold part of the detent protrusion 3 on one side of the detent groove 18 and in the longitudinal direction with respect to the vehicle body and allow vertical swing motion of the detent protrusion 3.

Figure 5:
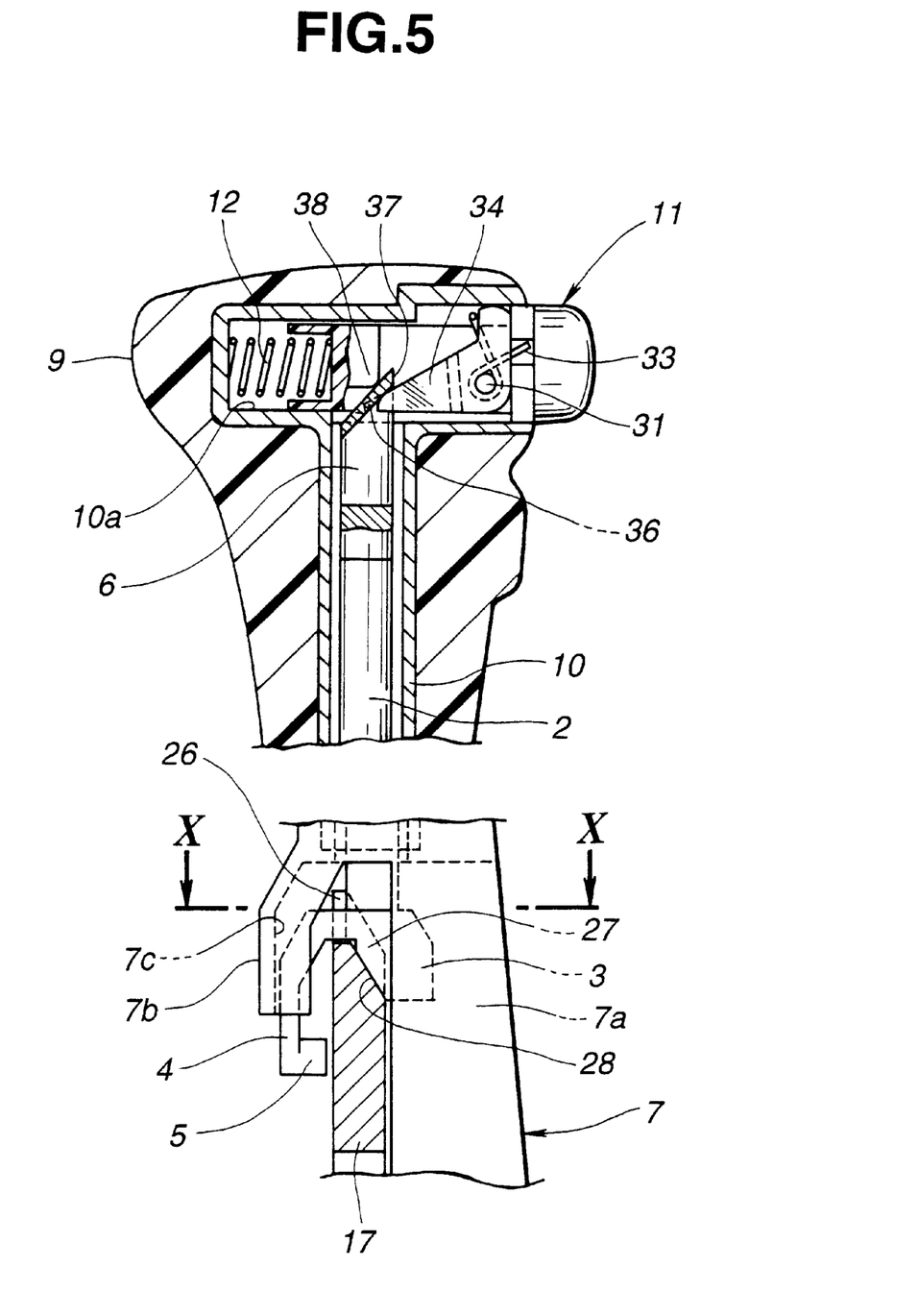
FIG. 5 is a fragmentary section for explaining operation of a shift lever.
Figure 10:
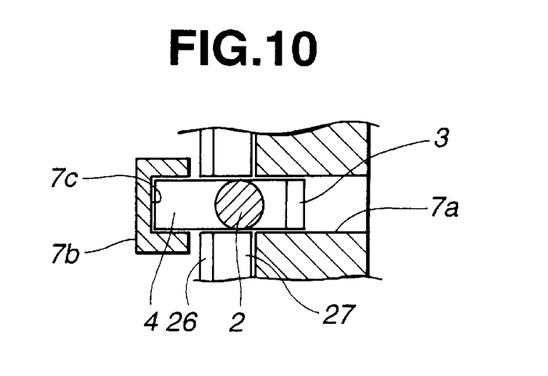
FIG. 10 is a sectional view taken along the line X—X in FIG. 5.

Referring to FIG. 5, a holder 7b is integrated with the shift-lever base 7 to partly conceal the position plate 17. Referring also to FIG. 10, a guide 7c having a C-shaped section is formed in the inner surface of the holder 7b to hold the arm 4 longitudinally with respect to the vehicle body and allow vertical movement of the arm 4.

Figure 3:
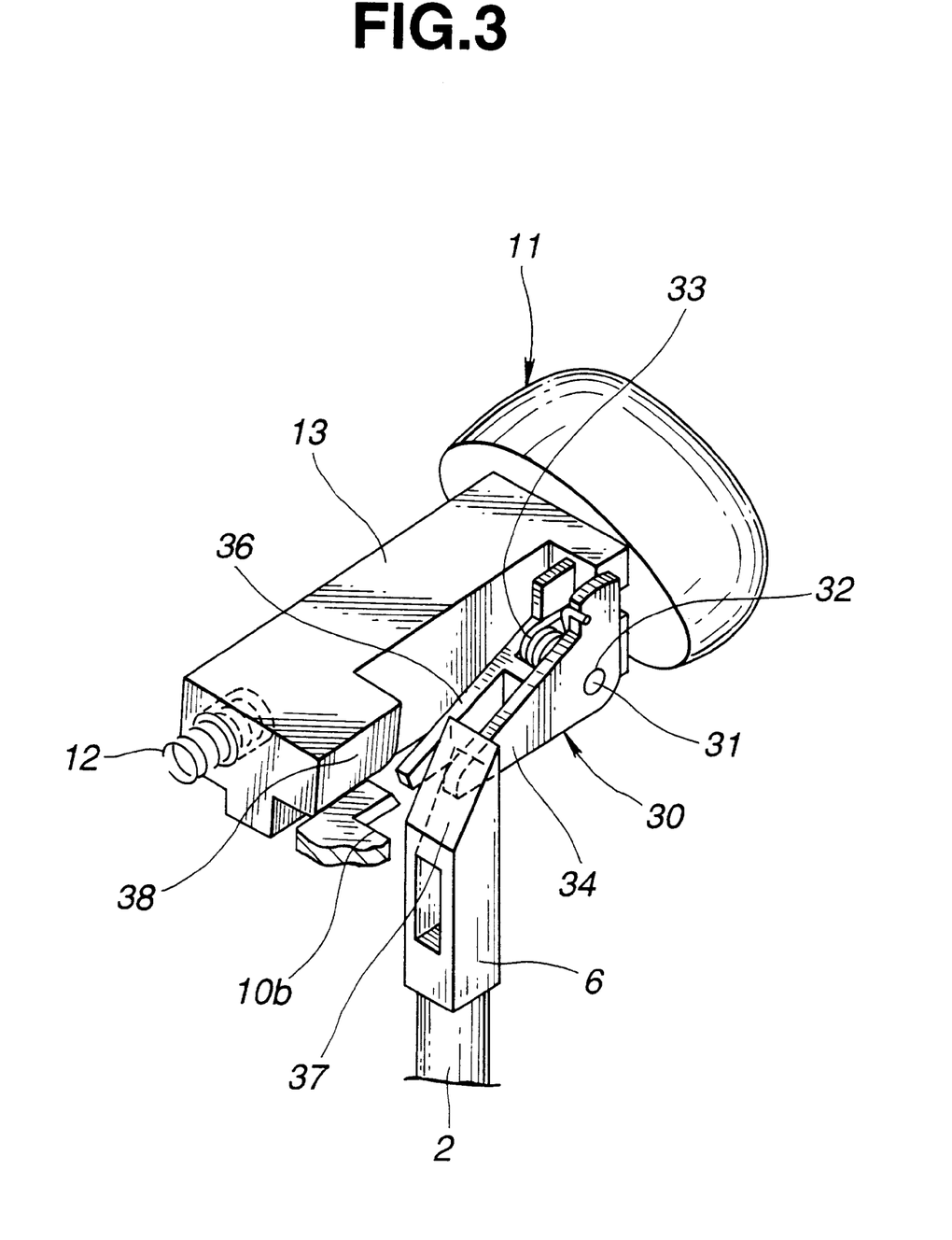
FIG. 3 is a view similar to FIG. 2, showing a knob button.

Referring to FIGS. 1 and 3, the knob button 11 comprises a main body 13 having a protrusion that a driver's finger will touch and a shaft pin 31, and an engaging member 30 swingably supported thereto and having a shaft hole 32. Specifically, the engaging member 30 is swingably supported to the main body 13 through the shaft pin 31 arranged through the shaft hole 32. The engaging member 30 includes a first lever 34 biased clockwise by a spring 33 as viewed in FIG. 3 to always allow upward movement of the pusher 6 mounted at the upper end of the compression rod 2, and a second lever 36 disposed outside the pusher 6 and abutting on the step 10b formed in the knob-button hole 10a and at the upper end of the skeleton 10. The pusher 6 is formed like a box having a taper 37 with an inclination of about 45° with respect to the knob button 11, and a rectangular opening in which an end of the first lever 34 can be introduced. Referring also to FIG. 5, integrated with the side of the main body 13 is a protrusion 38 with a rounded corner that contacts the outer surface of the taper 37 to depress the compression rod 2.

Figure 4:
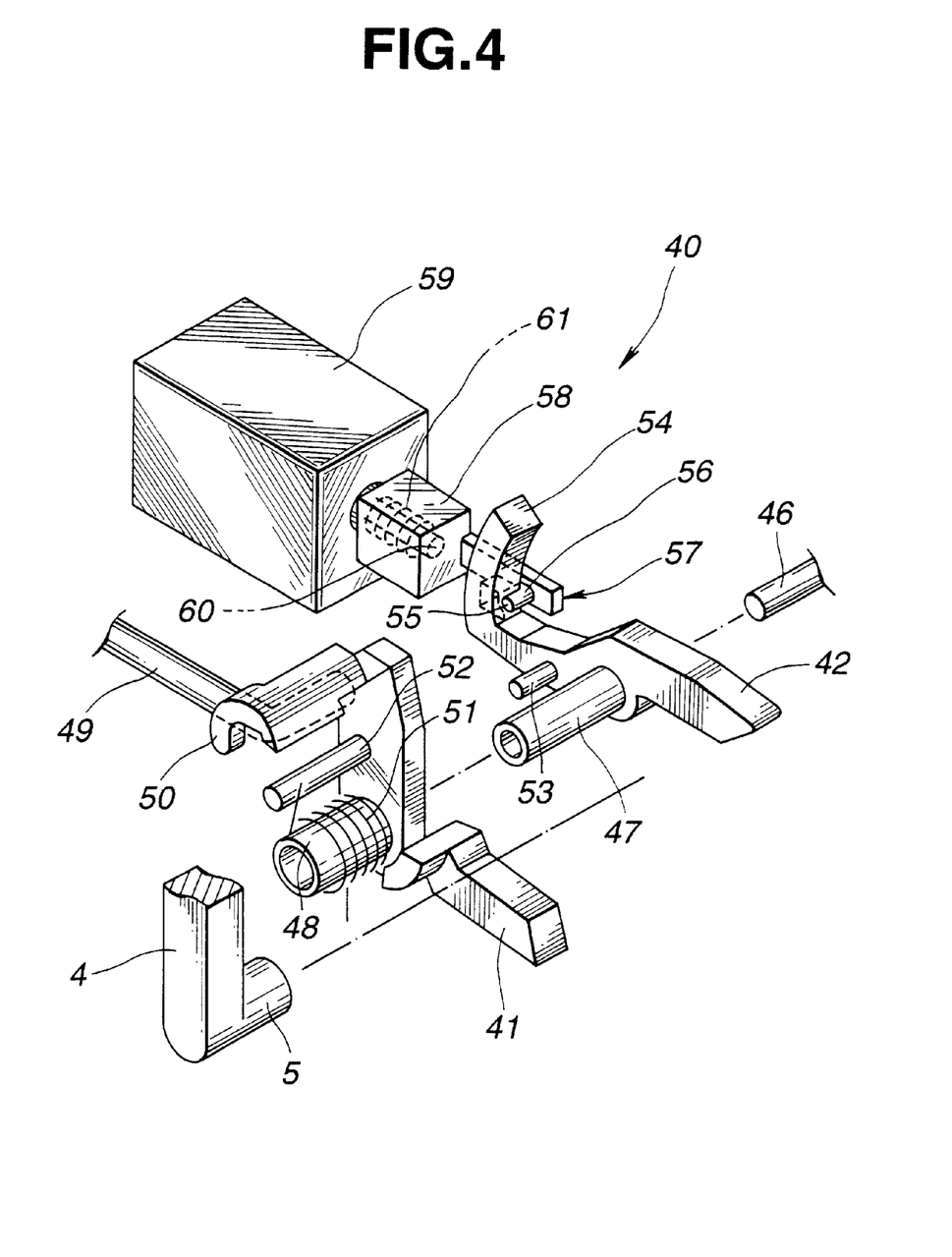
FIG. 4 is a view similar to FIG. 1, showing a shift locking unit.

Referring to FIGS. 1 and 4, the shank 5 of the arm 4 formed at the lower end of the compression rod 2 is held by one ends of a key lever 41 and a support lever 42 of the shift locking unit 40. The key lever 41 and the support lever 42 are coaxially rotatably supported, through telescopic cylindrical shanks 47, 48, by a shaft 46 that protrudes from a plate 45 integrated with a unit case 44 fixed to one side of the position plate 45. The key lever 41 is formed like substantially L, and is prevented from disengaging from the support lever 42 by a substantially L-shaped end member 49 through an anti-disengagement 50. The end member 49 comprises a metallic bar, and is rotatably supported at another end of the key lever 41 opposite to the one end for holding the shank 5. A return spring 51 is wound on the cylindrical shank 48, having one end engaged with an engagement protrusion 52 integrated with the key lever 41.

The support lever 42 includes in the vicinity of the cylindrical shank 47 an engagement protrusion 53 for engaging another end of the return spring 51, and at another end a circular arc 54 corresponding to part of a locus circle with center at the cylindrical shank 47. The circular arc 54 is formed with a recess 55 at the base. A lock pin 57 having a pin protrusion 56 engaged with the recess 55 is integrated with a mount 58, which is connected to a plunger 60 of an actuator 59 comprising a solenoid. A spring 61 is arranged between the mount 58 and the plunger 60. During operation, the actuator 59 draws the plunger 60 therein by an attracting force greater than a biasing force of the spring 61 to engage the pin protrusion 56 with the recess 55, restraining movement of the support lever 42. During non-operation of the actuator 59, the plunger 60 is protruded from the actuator 59 by a biasing force of the spring 61 to disengage the pin protrusion 56 from the recess 55, allowing movement of the support lever 42.

Figure 6:
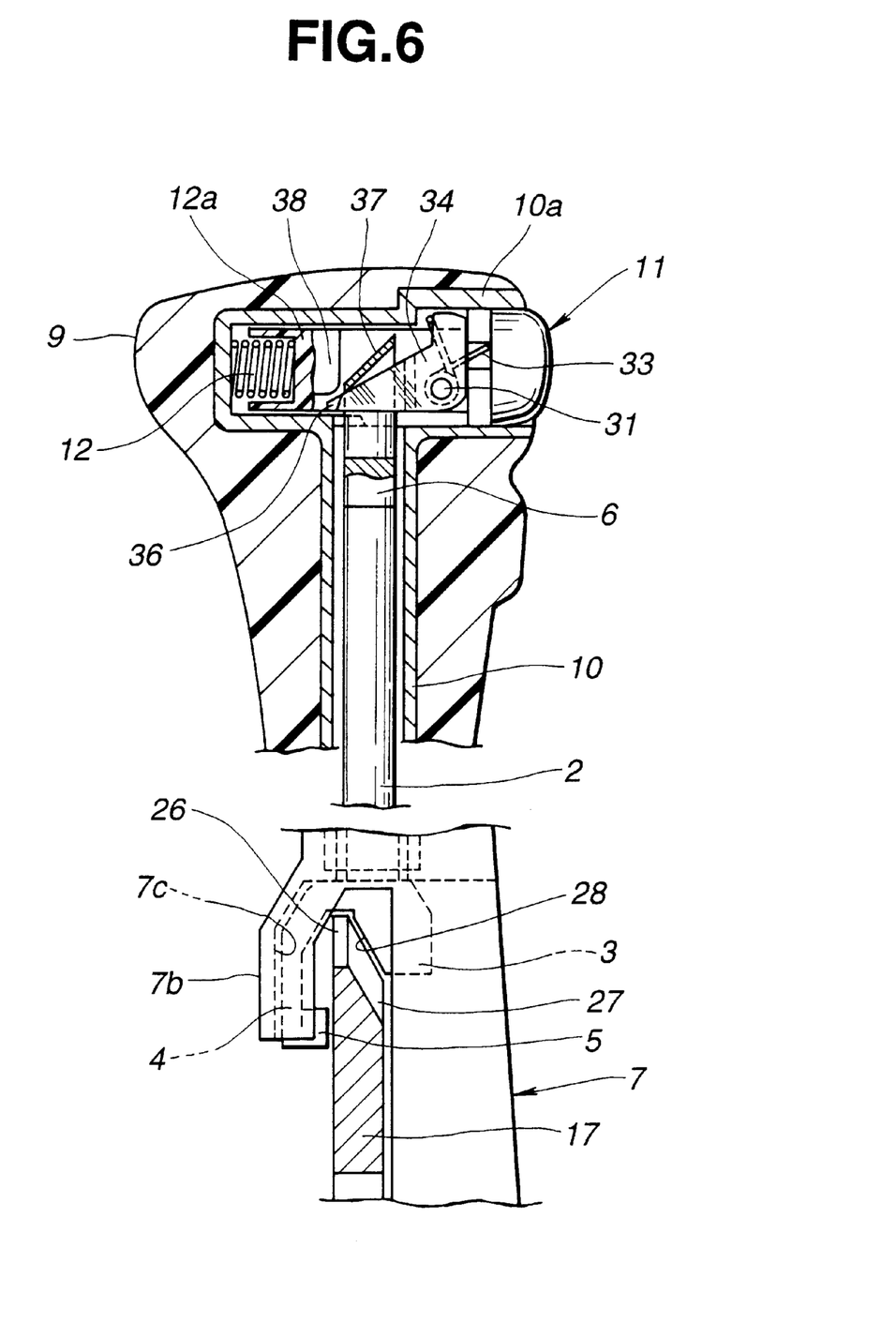
FIG. 6 is a view similar to FIG. 5, for explaining operation of the shift lever.

Next, operation of the first embodiment will be described. When holding the knob 9 to press the knob button 11 in the state as shown in FIG. 5, the first lever 34 is introduced in the pusher 6 arranged at the upper end of the compression rod 2 as shown in FIG. 6, so that an end of the first lever 34 contacts the taper 37 to move it upward. Thus, the detent protrusion 3 arranged at the lower end of the compression rod 2 disengages from the shift portion 26 of the detent groove 18 to be able to move from one shift position to another shift position. When releasing the knob button 11 from being pushed after moving the shift lever 1 to a predetermined shift position, the knob button 11 is protruded from the knob 9 by a biasing force of the spring 12 to return to an initial state as shown in FIG. 5. And the protrusion 38 contacts the taper 37 to provide a depressing force to the compression rod 2, so that the detent protrusion 3 arranged at the lower end of the compression rod, 2 is moved downward to be engageable with the shift portion 26.

Even if the shift lever 1 is swung with the compression rod 2 insufficiently moved upward, and the detent protrusion 3 collides with the side wall of the shift portion 26 of the detent groove 18, since the detent protrusion 3 is held by the guide 7a in the vicinity of the side of the engagement, the detent protrusion 3 undergoes a shearing force only and no bending load, enabling a great improvement in engagement strength, resulting in no occurrence of breakage of the detent protrusion 3.

Further, the arm 4 integrated with the detent protrusion 3 is held longitudinally with respect to the vehicle body by the guide 7c of the holder 7b integrated with the shift-lever base 7, which means holding of the vicinity of the engagement of the detent protrusion 3 and the shift portion 26 of the detent groove 18, having no twisting load applied to the detent protrusion 3, enabling a further improvement in engagement strength.

Furthermore, since the shift portion 26 and the detent protrusion 3 that collides therewith have the taper surfaces 27, 28, respectively, the length of a shearing line operating the shift portion 26 can be increased with respect to the width W of the position plate 17 (see FIG. 2), enabling an increase in shearing area, resulting in possible improvement in shearing strength.

Still further, the taper surfaces 27, 28 are inclined with respect to the axis of the compression rod 2, enabling a reduction in hammering produced by contact of the detent protrusion 3 with the detent groove 18.

During non-operation of the knob button 11, referring to FIG. 5, the compression rod 2 is held by the protrusion 38 and the first lever 34 with no occurrence of rattling.

Note that as the taper surfaces 27, 28 are greater than the width W of the shift portion 26, the shearing area is increased to disperse a shearing force, resulting in reduced force for breaking the shift portion 26 or the detent protrusion 3 of the compression rod 2.

Figure 7:
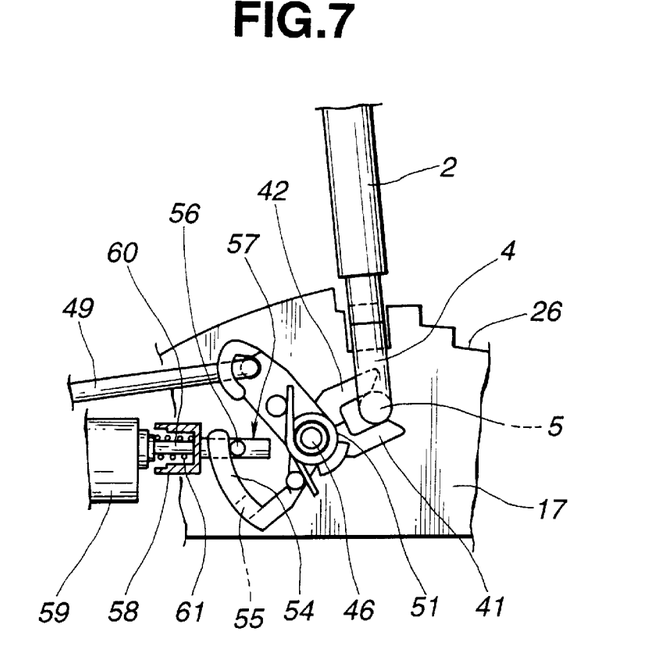
FIG. 7 is a diagrammatic view for explaining operation of the shift locking unit.

Referring to FIG. 7, when the shift-lever base 7 is rotated longitudinally with respect to the vehicle body about the shank 8 to move the shift lever 1 to the P range, the arm 4 arranged at the lower end of the compression rod 2 is moved together to put the shank 5 between the key lever 41 and the support lever 42. As soon as the knob button 11 is released from being pressed, the compression rod 2 is moved downward to hold the shank 5 by the key lever 41 and the support lever 42.

Figure 8:
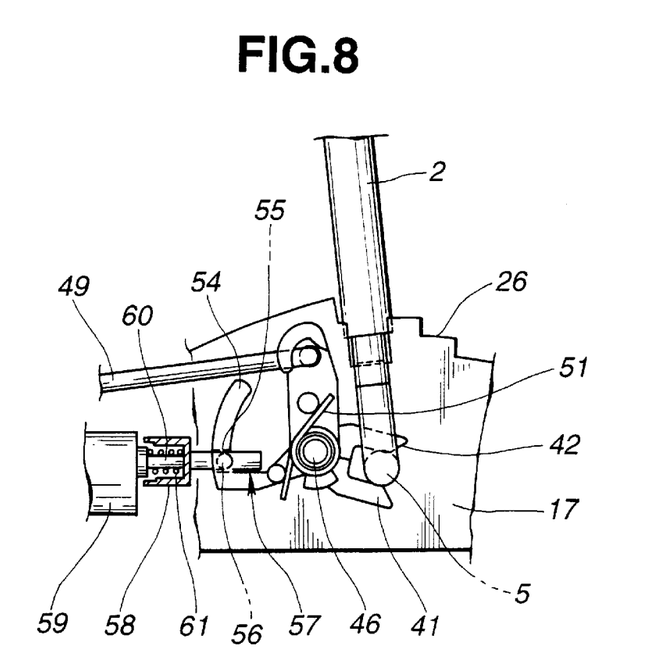
FIG. 8 is a view similar to FIG. 7, for explaining operation of the shift locking unit.

Referring to FIG. 8, when a switch 29 detects that the shift lever 1 is moved to the P range, the actuator 59 is supplied with power to rotate clockwise the key lever 41 about the shaft 46 and the support lever 42. When the recess 55 of the support lever 42 comes to face the pin protrusion 56, the actuator 59 draws the plunger 60 therein by an attracting force greater than a biasing force of the spring 61 to engage the pin protrusion 56 with the recess 55, restraining movement of the support lever 42.

Referring to FIG. 9, when pressing the knob button 11 in that state, the first lever 34 is rotated downward along the taper 37 of the pusher 6 since the compression rod 2 cannot be moved upward, and the end of the second lever 36 is engaged with the step 10b protrusively formed on the inner periphery of the skeleton 10 of the knob 9, preventing the knob button 11 from being pressed. Thus, the shank 5, which is held by the key lever 41 and the support lever 42, cannot be moved upward, obtaining shift lock.

When having key lock to turn off a power supply of a vehicle, the plunger 60 of the actuator 59 is protruded by a biasing force of the spring 61 to disengage the pin protrusion 56 from the recess 55. However, since key lock prevents movement of the end member 49, rotation of the key lever 41 is prevented. Since a biasing force of the return spring 51 arranged between the key lever 41 and the support lever 42 is greater than that of the spring 33 for biasing the engaging member 30, the second lever 36 is engaged with the step 10b before the support lever 42 is rotated to move the compression rod 2 upward. Thus, press of the knob button 11 cannot produce upward movement of the compression rod 2, obtaining shift lock. Therefore, the shift lever 1 cannot be operated.

When releasing key lock to turn on the power supply of the vehicle for cruising, the actuator 59 is supplied with power and operates to draw the plunger 60 to engage the pin protrusion 56 with the recess 55. Depression of a brake pedal shuts off power to the actuator 59 to disengage the pin protrusion 56 from the recess 55, enabling rotation of the key lever 41 and the support lever 42. This makes the compression rod 2 free. Thus, when pressing the knob button 11, the first lever 34 can move the compression rod 2 upward without any contact of the second lever 36 with the step 10b, enabling shift operation.

Having described the present invention with regard to the preferred embodiment, it is noted that the present invention is not limited thereto, and various changes and modifications can be made without departing from the scope of the present invention.

By way of example, in the embodiment, the shift-lever device is locked when the actuator 59 is operated, and is unlocked when it is not operated. Alternatively, the shift-lever device may be locked when the actuator 59 is not operated, and be unlocked when it is operated. In that case, it is necessary to change the biasing direction of the spring 61 from right to left as viewed in FIG. 7, and to protrude the plunger 60 rightward during operation of the actuator 59 or change the position of the pin protrusion 56 with respect to the recess 55 from right to left. That is, when the shift lever 1 is in the D range, the actuator 59 is supplied with no power, so that the pin protrusion 56 contacts the circular arc 54 formed with the support lever 42 by a biasing force of the spring 61. And as soon as the knob button 11 is released from being pressed after the shift lever 1 is moved to the P range, the support lever 42 and the key lever 41 are rotated with movement of the compression rod 2 to slide the pin protrusion 56 on the circular arc 54. When reaching the recess 55, the pin protrusion 56 is engaged with the recess 55 by a biasing force of the spring 61, obtaining shift lock.

In that state, when having key lock to turn off the power supply of the vehicle, shift lock is maintained, resulting in no need of additional setting such as making a biasing force of the spring 61 greater than that of the spring 33. Moreover, in that state, depression of the brake pedal makes the actuator 59 supplied with power to disengage the pin protrusion 56 from the recess 55, enabling shift operation. That is, the actuator 59 is supplied with power only upon depression of the brake pedal, enabling shortened operating time of the actuator 59, resulting in possible elongation of the life thereof.

What is claim is:

1. A shift-lever device for a motor vehicle with a vehicle body, comprising:
   a base plate mounted to the vehicle body;
   a position plate integrated with said base plate, said position plate being formed with a detent groove;
   a shift lever supported to said base plate to be swingable along said position plate, said shift lever including a base arranged adjacent to said position plate, a knob arranged at an upper end, and a knob button arranged with said knob;
   a compression rod arranged through said shift lever to axially be movable by operation of said knob button of said shift lever, said compression rod including an arm at a lower end;

a detent protrusion positioned at a lower end of said compression rod for engagement with said detent groove of said position plate; and a guide formed in said base of said shift lever, laterally adjacent to a side of said position plate, said detent protrusion being retained within said guide.

2. A shift-lever device as claimed in claim 1, wherein said detent groove and said detent protrusions are formed with taper surfaces inclined with respect to said base of said shift lever, respectively, said taper surfaces being opposite and in parallel to each other.

3. A shift-lever device as claimed in claim 1, wherein said guide includes two portions each portion being arranged laterally adjacent to an opposite side of said position plate.

4. A shift-lever device as claimed in claim 3, wherein one of said two guide portions includes a slit positioned generally parallel to said compression rod.

5. A shift-lever device as claimed in claim 1, further comprising:

a pusher mounted to said compression rod at an upper end, said pusher being formed with a taper inclined with respect to said knob button;

an engaging member swingably mounted to said knob button, said engaging member including a first lever contacting said taper of said pusher from the side of said knob button to allow axial movement of said compression rod; and a shift locking unit mounted to said position plate, wherein when said shift lever is moved to a P range, said shift locking unit is engaged with said arm of said compression rod to prevent axial movement of said compression rod.

6. A shift-lever device as claimed in claim 4, wherein said engaging member includes a second lever disposed outside of said pusher, wherein when said shift lever is moved to the P range said second lever rotates to engage a step formed in said knob of said shift lever to prevent said knob button from being operated.

7. A shift-lever device as claimed in claim 5, wherein said shift locking unit comprises a key lever and a support lever rotatably supported to said position plate and biased to be adjacent to each other and having first ends for holding an end of said arm of said compression rod, a lock pin to be engaged with a recess formed at a second end of said support lever for preventing rotation of said support lever, and an actuator for engaging said lock pin with said recess.

8. A shift-lever device as claimed in claim 1, wherein said lower end of the compression rod includes c-shaped arm integrally formed with said detent protrusion.

9. A shift-lever device as claimed in claim 8, wherein said guide includes two portions, each portion being arranged laterally adjacent to an opposite side of said position plate.

10. A shift-lever device as claimed in claim 9, wherein one of said two guide portions includes a slit positioned generally parallel to said compression rod.

11. A shift-lever device as claimed in claim 10, wherein said detent protrusion is retained in said slit.

12. A shift-lever device as claimed in claim 9, wherein one of said two guide portions include a c-shaped groove.

13. A shift-lever device as claimed in claim 12, wherein said c-shaped arm is retained in said groove.

14. A shift-lever device for a motor vehicle with a vehicle body, comprising:

a base plate mounted to the vehicle body;

a position plate integrated with said base plate and being formed with a detent groove;

a shift lever swingably supported to said base plate to be swingable along said position plate, said shift lever including a knob arranged at an upper end and a knob button arranged with said knob;

a compression rod arranged through said shift lever to axially be movable by operation of said knob button of said shift lever, said compression rod including an arm at a lower end;

a detent protrusion positioned at a lower end of said compression rod for engagement with said detent groove of said position plate;

a guide formed in said base of said shift lever laterally adjacent to a side of said position plate, said detent protrusion being retained within said guide;

a pusher mounted to said compression rod at an upper end, said pusher being formed with a taper inclined with respect to said knob button;

an engaging member swingably mounted to said knob button, said engaging member including a first lever contacting said taper of said pusher from the side of said knob button to allow axial movement of said compression rod; and a shift locking unit mounted to said position plate, wherein when said shift lever is moved to a P range, said shift locking unit is engaged with said arm of said compression rod to prevent axial movement of said compression rod.

* * * * *

UNITED STATES PATENT AND TRADEMARK OFFICE
CERTIFICATE OF CORRECTION

PATENT NO. : 6,189,398 B1
DATED : February 20, 2001
INVENTOR(S) : Kataumi et al.

It is certified that error appears in the above-identified patent and that said Letters Patent is hereby corrected as shown below:

<u>Title page,</u>
Item [73] Assignee, delete "Fuji Koko Co., Ltd." replace with -- Fuji Kiko Co., Ltd. --.

Signed and Sealed this

Fifth Day of March, 2002

*Attest:*

JAMES E. ROGAN
*Director of the United States Patent and Trademark Office*

*Attesting Officer*